Figure 1:
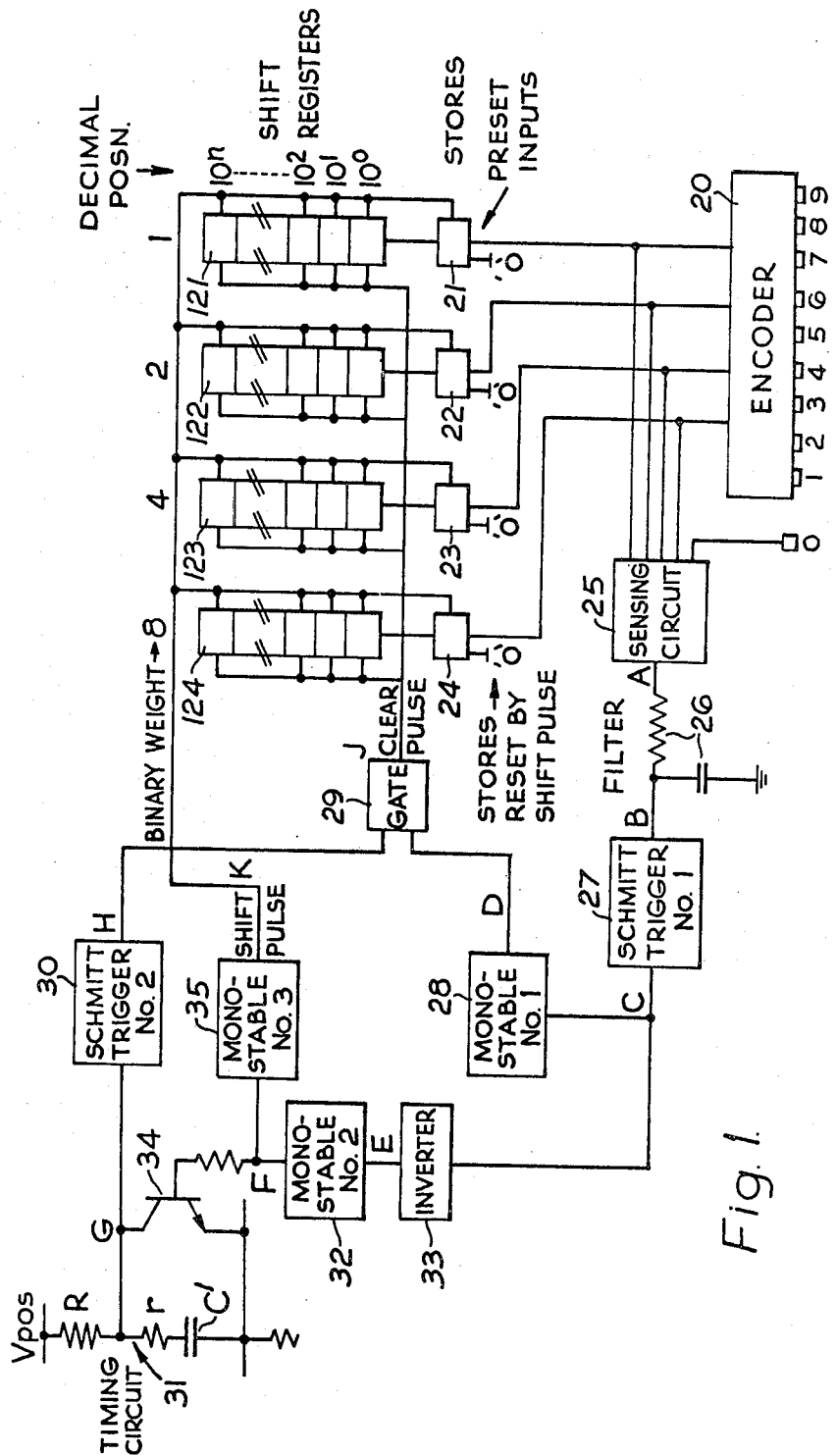

United States Patent
Caulkin

[15] 3,681,574
[45] Aug. 1, 1972

[54] APPARATUS FOR SERIALLY ENTERING INFORMATION INTO A SHIFT REGISTER

[72] Inventor: William Ernest Caulkin, Kingstanding, England

[73] Assignee: W & T Avery Limited, Birmingham, England

[22] Filed: March 30, 1970

[21] Appl. No.: 23,720

[30] Foreign Application Priority Data

April 3, 1969   Great Britain..............17,443/69

[52] U.S. Cl................235/92 SH, 328/48, 235/92 R, 340/337, 340/347 DD, 235/92 DE
[51] Int. Cl............................................H03k 23/02
[58] Field of Search.................235/92, 68, 52, 60, 37; 328/37, 48; 307/221; 340/168 S, 337, 347 DD, 347 AD

[56] References Cited

UNITED STATES PATENTS

| 3,183,367 | 5/1965 | Van Berkel...............328/48 X |
| 1,054,336 | 2/1913 | Brown.......................340/337 X |
| 3,100,850 | 8/1963 | McMillian et al............328/48 X |
| 3,418,586 | 12/1968 | Asher.........................328/37 X |
| 3,452,151 | 6/1969 | Harbour et al..............328/48 X |
| 3,492,422 | 1/1970 | Mason et al................340/347 X |
| 3,564,557 | 2/1971 | Ruthazer................340/347 DD |

Primary Examiner—Thomas A. Robinson
Assistant Examiner—Joseph M. Thesz, Jr.
Attorney—Norris & Bateman

[57] ABSTRACT

A circuit for serially entering information into a shift register which avoids the need to re-set the register with a previous or subsequent separate re-setting operation, comprising a sensing circuit responsive to each of a sequence of operations of an encoder, and a timing switch which is under the control of the sensing circuit so as to be operative on a operation of the encoder to clear from the shift register information related to a next preceding operation of the encoder after a pre-determined time interval has elapsed from this preceding operation.

5 Claims, 2 Drawing Figures

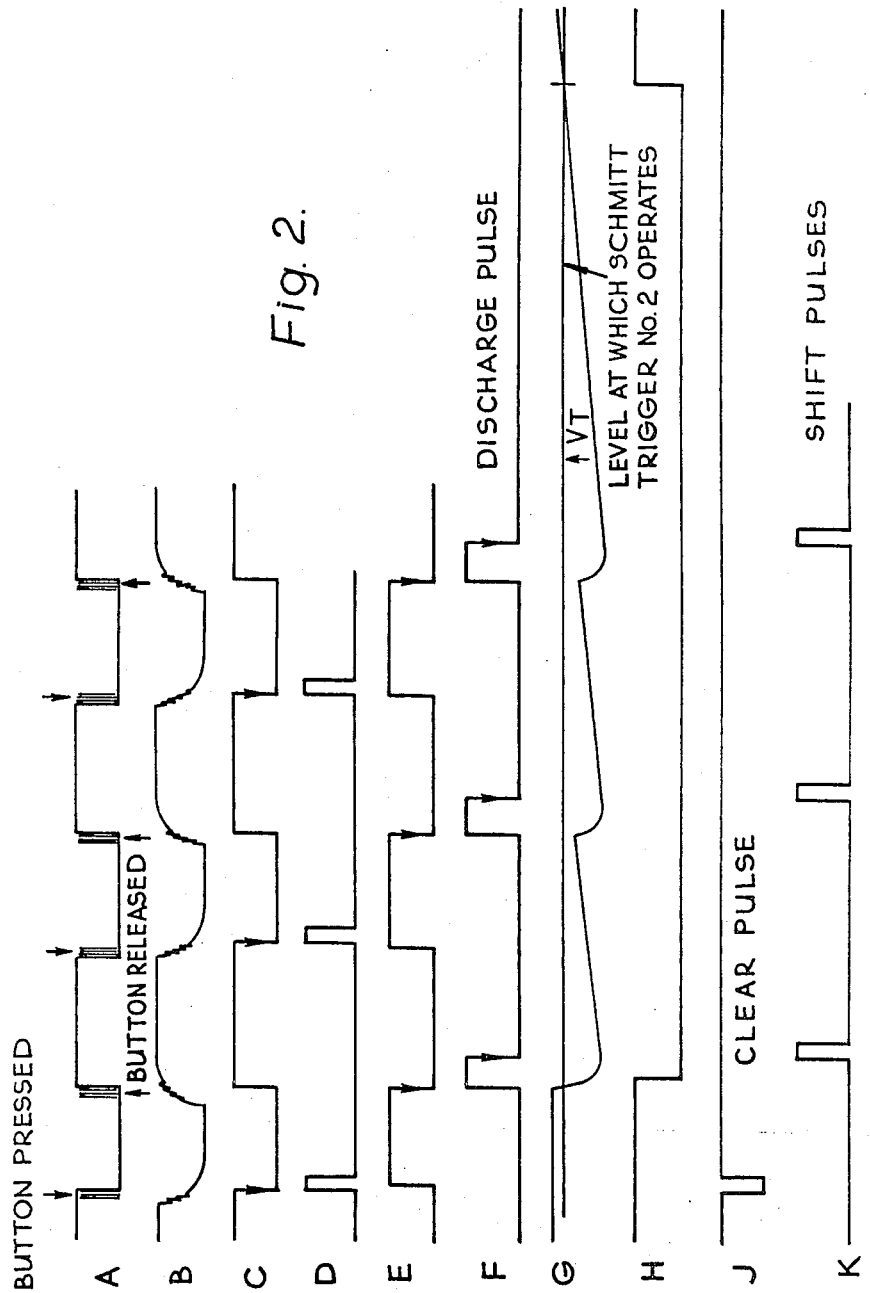

APPARATUS FOR SERIALLY ENTERING INFORMATION INTO A SHIFT REGISTER

This invention resides in apparatus for serially entering information into a shift register and more particularly, but not exclusively, such apparatus involving manual serial entry of information from a push button operated or like decimal encoder into the shift register.

In conventional shift register operation the entry of a sequence of digits must be preceded or followed by a separate re-setting operation, and the present invention has for its object the avoidance of the latter. A further object is the avoidance of the need for entry of non-significant zeros of a number.

According to the invention apparatus for serially entering information into a shift register comprises an encoder, sensing circuit means operative to sense each of a sequence of operations of the encoder, and a timing circuit under the control of the sensing circuit and operative on an operation of the encoder to clear from the shift register information related to a next preceding operation of the encoder if a predetermined time interval has elapsed from this preceding operation of the encoder.

In one form of the above apparatus according to the invention the encoder comprises a manually operated decimal encoder and the sensing and timing circuits provide decade up-grading, i.e., multiplication by the factor 10, of previously inserted information only on further manual operation of the encoder within the predetermined time interval from the last preceding operation.

One example of the practical realization of the invention is described with reference to the accompanying drawings wherein:

FIG. 1 is a block schematic circuit diagram of the apparatus according to the invention; and FIG. 2 illustrates waveforms A to K prevailing at respectively marked points of the circuit of FIG. 1.

The encoder 20 comprises a set of 10 manually operable push buttons designated 0 to 9 serving to transform decimal information appropriate to an operated push button into an 8.4.2.1. weighted binary coded decimal output which is fed into pre-set inputs of four stores 21-24.

A sensing circuit 25 comprising a plurality of NAND gates each having their two inputs connected to a respective push button output and their outputs connected in common, detects operation of a push button to give an output of the waveform indicated at A in FIG. 2 having oscillations on its leading and trailing edges arising from contact bounce at a push button. The sensing circuit output is smoothed by a resistance capacity filter 26 to be fed as waveform B to a first Schmitt trigger circuit 27 to give a clean pulse waveform C at the output of the latter. The leading edge of the pulse from the latter triggers a first monostable circuit 28 to produce a narrow clear pulse of waveform D and the latter is gated at 29 under control of the output of a second Schmitt trigger circuit 30. With the output of the latter in "0" condition the pulse is blocked at the gate 29, whereas with the output in "1" condition the pulse is inverted as in waveform J and is passed by the gate 29 to reset all the units 121-124 of the shift register to zero.

The output of the second Schmitt trigger circuit 30 is controlled by a resistance capacity timing circuit 31 wherein the capacitor C' is normally charged to a supply voltage (Vpos) to give a "1" output from the Schmitt trigger circuit 30. Thus when a digit is entered via the encoder 20 into the stores 21-24, the clear pulse derived by the sensing circuit 25 is able to pass through the gate 29 and clear previous information present in the shift registers 121-124. When the push button is released the trailing edge of the output C of the first Schmitt trigger circuit 27 triggers a second monostable circuit 32 via an inverter 33 of waveform output E to produce a pulse of waveform F so that the latter discharges the capacitor C' via resistor r (of appreciably lower value than resistor R) and a transistor 34.

The output of the second Schmitt trigger circuit 30 falls to zero on discharge of the capacitor C' so preventing any further pulses from the first monostable circuit 28 passing through the gate 29 to clear the register until the output of the second Schmitt trigger circuit 30 returns to a "1" condition. The trailing edge of the discharge pulse triggers a third monostable circuit 35 to produce a shift pulse in wave form which pulse shifts the information from the stores 21-24 into the first stages of the shift registers 121-124.

Immediately after the trailing edge of the discharge pulse, the capacitor C' begins to recharge towards voltage Vpos with a time constant C'R (the resistance R being much greater than the resistance r). The voltage at point G of the timing circuit 31 rises towards the triggering voltage level Vt of the second Schmitt trigger circuit 30. If an encoder press button is operated to enter a next digit into the stores 21-24 before the second Schmitt trigger circuit 30 triggers, the clear pulse produced from the button operation is blocked by the gate 29, and the subsequent button release generates a shift pulse which causes the information already in the shift registers 121-124 to be shifted one place further in and the next digit information from the stores 21-24 to be entered into the vacated first units of the shift register. Further less significant digits of the number are serially entered in the same way. However, if the second Schmitt trigger 30 triggers before a push button is pressed for another digit to be entered, a clear pulse is allowed to pass through the gate 29 to zero the shift registers 121-124 before the information corresponding to this further digit is shifted from the stores 21-24 into the shift registers upon release of the push button.

The above described system has the advantage of a keying in time which is not fixed but is variable depending upon the number of digits to be serially entered.

What I claim is:

1. Apparatus for serially entering digit information into a shift register comprising an encoder connected to feed said information into the shift register in a sequence of operations, a sensing circuit means operative to sense each of said sequence of digit encoding operations of the encoder, and a timing circuit under the control of the sensing circuit and operative on an operation of the encoder to clear from the shift register information related to a last preceding and earlier operations of the encoder if a predetermined time interval has elapsed from said last preceding operation of the encoder, said encoder being a manually operated decimal-binary encoder, and the sensing circuit and timing circuit cooperating to provide decade upgrading of the previously entered information in the register only following further manual operation of the encoder within the pre-determined time interval from the last preceding operation.

2. Apparatus according to claim 1 characterized by a gate operative to block passage of a clearing pulse to the register for a predetermined time interval immediately following an operation of the encoder.

3. Apparatus according to claim 3 characterized in that said gate is controlled by a trigger circuit in turn controlled by the voltage of a condenser in the timing circuit.

4. Apparatus according to claim 1 characterized in that manual operation of the encoder effects entry of a digit information into a store with accompanying clearance or non-clearance of the register of previously entered information according to the elapsed time interval, whereas cessation of said manual operation effects decade upgrading of said previously entered information if this has not been cleared and also transmission of the further information from the store into the register.

5. Apparatus according to claim 4 wherein the encoder is push button operated, characterized by circuit means responsive to the leading edge of a pulsed wave derived by the sensing circuit from operation of a push button to provide a clearing signal to the register, and by further circuit means responsive to a trailing edge of said pulsed wave corresponding to cessation of operation of the push button to provide a shift pulse to the register to effect said upgrading and transmission of the information from the store to the shift register.

* * * * *